(12) United States Patent
Oh (10) Patent No.: US 7,878,555 B2
(45) Date of Patent: Feb. 1, 2011

(54) COUPLING DEVICE FOR CIRCULAR PIPES (75) Inventor: Seung-Il Oh, Seoul (KR)

(73) Assignee: Kofulso Co., Ltd., Incheon-si (KR)

( * ) Notice: Subject to any disclaimer, the term of this patent is extended or adjusted under 35 U.S.C. 154(b) by 765 days.

(21) Appl. No.: 11/826,835

(22) Filed: Jul. 18, 2007

(65) Prior Publication Data

US 2009/0021001 A1 Jan. 22, 2009

(51) Int. Cl.
*F16L 17/00* (2006.01)

(52) U.S. Cl. ........................................ 285/340; 285/319
(58) Field of Classification Search ................. 285/340, 285/319, 321, 382
See application file for complete search history.

(56) References Cited

U.S. PATENT DOCUMENTS 2,995,388 A * 8/1961 Morello, Jr. et al. ......... 285/340

* cited by examiner

*Primary Examiner*—Aaron Dunwoody
(74) *Attorney, Agent, or Firm*—Jacobson Holman PLLC (57) ABSTRACT

A coupling device for circular pipes, in which locking rings, inserted into a body to clamp a circular pipe, are arranged in a pair so that the central line of a circular pipe can be aligned when the circular pipe is inserted. Furthermore, the degree to which the body presses the seal packing can be adjusted so that a reliable seal can be maintained and the circular pipe can be securely coupled no matter who uses the coupling device. A coupling device for corrugated and circular pipes is provided for the case where it is more effective to replace one of the circular pipes with a corrugated pipe. The first coupling section and a connecting means, which can engage with a corrugated pipe, are provided opposite the second coupling section, which is coupled with the circular pipe.

11 Claims, 10 Drawing Sheets

COUPLING DEVICE FOR CIRCULAR PIPES

BACKGROUND OF THE INVENTION

1. Field of the Invention

The present invention relates to a coupling device for circular pipes, and more particularly to a coupling device for circular pipes, in which a pair of locking rings is arranged to clamp a circular pipe and a body for receiving the circular pipe is configured to press a packing in order to ensure a seal.

2. Description of the Related Art

As well known in the art, in a conventional coupling device for circular pipes, a packing, a support ring and a locking ring are inserted sequentially into a body, and a nut having an entrance hole is engaged with the body so that the packing maintains a seal and the locking ring clamps a circular pipe. With the circular pipe inserted into the coupling device through the entrance hole, the locking ring exerts a locking force on the circular pipe so that it is not separated from the coupling device even if an external force is applied in a direction opposite to a direction of inserting the circular pipe.

In a coupling device having this structure, the packing is simply inserted into and coupled with the body. Accordingly, after the circular pipe is inserted into and coupled with the body of the coupling device, in the case where contents flowing through the connecting device leak from the coupling device or the circular pipe is not correctly inserted in a horizontal position, it becomes necessary to separate the circular pipe from the coupling device. However, in order to separate the circular pipe, it is required to break the body of the coupling device or cut the circular pipe.

For these reasons, the conventional coupling device for circular pipes can be used only by skilled persons.

Furthermore, conventional circular copper pipes, which have been widely used, are being replaced by stainless corrugated pipes these days. Accordingly, in some cases, it is efficient to replace a conventional circular pipe with a corrugated pipe. However, no means for connecting the circular pipe with the corrugated pipe has been devised.

SUMMARY OF THE INVENTION

The inventor has made great effort to find a device that can be used to couple a corrugated pipe and a circular pipe with each other, which is urgently needed in the art, while overcoming the problems with the conventional device for coupling circular pipes, and as a result of these efforts, devised the present invention.

The present invention has been made to solve the foregoing problems with the prior art, and therefore an object of the present invention is to provide a coupling device for circular pipes, in which locking rings, inserted into a body to clamp a circular pipe, are arranged in a pair so that the central line of a circular pipe can be aligned when the circular pipe is inserted, and the extent to which the body presses the seal packing can be adjusted so that a seal can be satisfactorily maintained and the circular pipe can be securely coupled no matter who uses the coupling device.

Another object of the present invention is to provide a coupling device for corrugated and circular pipes, adapted to the case where it is more effective to replace one of the circular pipes with a corrugated pipe, in which a first coupling section and a connecting means that can engage with a corrugated pipe are provided opposite the second coupling section, which is coupled with the circular pipe.

According to an aspect of the invention for realizing the object, the invention provides a coupling device for circular pipes including a body including a first coupling section at one portion thereof, a second coupling section at another portion thereof, a flange protruding from an end of the second coupling section, a coupling hole formed in the second coupling section, a circular pipe coupling hole extending from the coupling hole and a connecting hole extending from the circular pipe coupling hole and through the first coupling section; a circular pipe locking means including a first locking ring, a first support ring, a second locking ring, a ring, a first ring packing and a nut, which are inserted sequentially into the coupling hole of the body; a fixing member for fixing the nut to the flange of the body; an adjustment member having an entrance hole corresponding to the outside diameter of a circular pipe, which will be inserted into the adjustment member, and threads formed on the outer circumference of the adjustment member, the threads engaging into the screw hole of the nut, thereby applying an external force to the first ring packing.

According to another aspect of the invention for realizing the object, the coupling device can further include a corrugated pipe connecting means, which includes: the first coupling section of the body, having threads in an outer periphery thereof, a packing coupling hole in an entrance thereof, a corrugated pipe coupling hole extending from the packing coupling hole and an annular prominence between the corrugated pipe coupling hole and the circular pipe coupling hole; a packing having an insert section at one portion, inserted into the packing coupling hole, and a protrusion at another portion, extending out of the packing coupling hole; a compression ring having a ring section in contact with the end of the protrusion of the packing, a plurality of jaws projecting in a direction opposite a direction of inserting the corrugated pipe, and a plurality of slopes, each formed in an outer portion of each of the jaws; and a locking member having a screw hole in an inner periphery thereof, engaging with the threads, an entrance hole in a center of one side thereof and a slope between the screw hole and the entrance hole, corresponding to the slopes of the jaws.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

The present invention will now be described more fully with reference to the accompanying drawings, in which preferred embodiments of the invention are shown.

Figure 1:
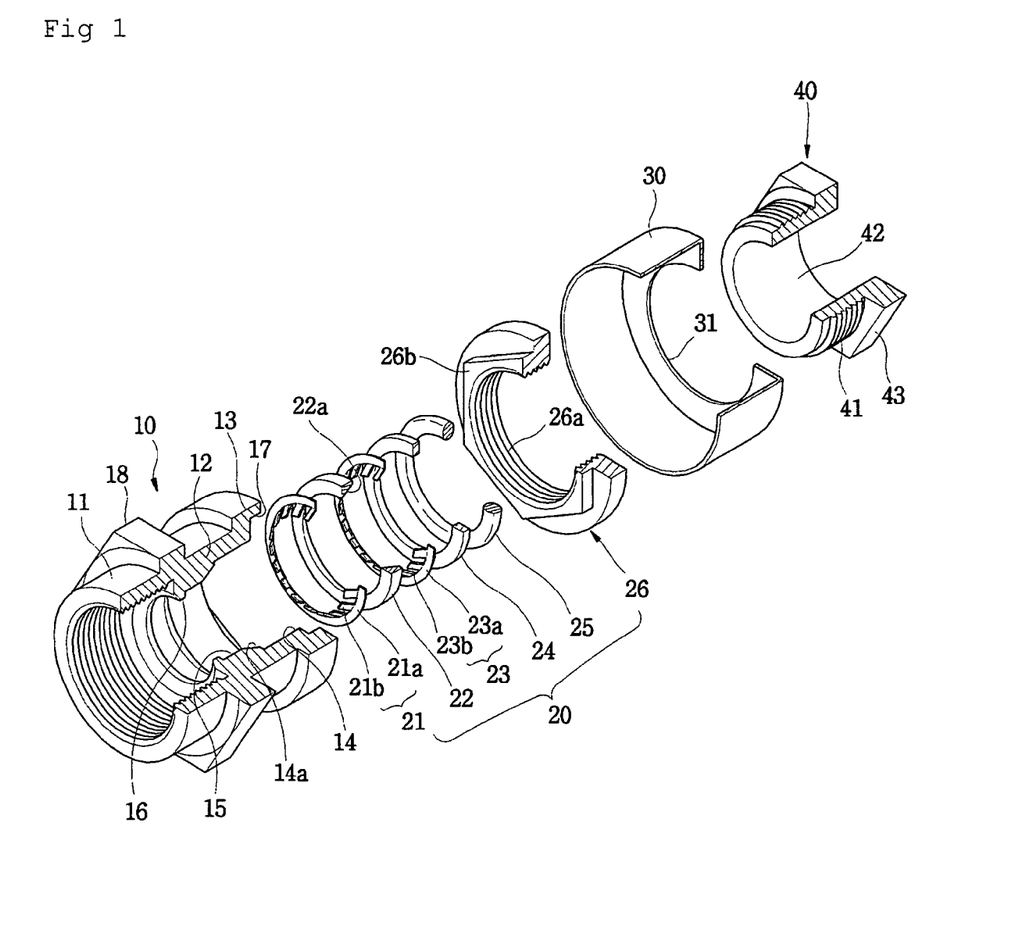
FIG. 1 is an exploded perspective view illustrating a coupling device according to an embodiment of the present invention.
Figure 2:
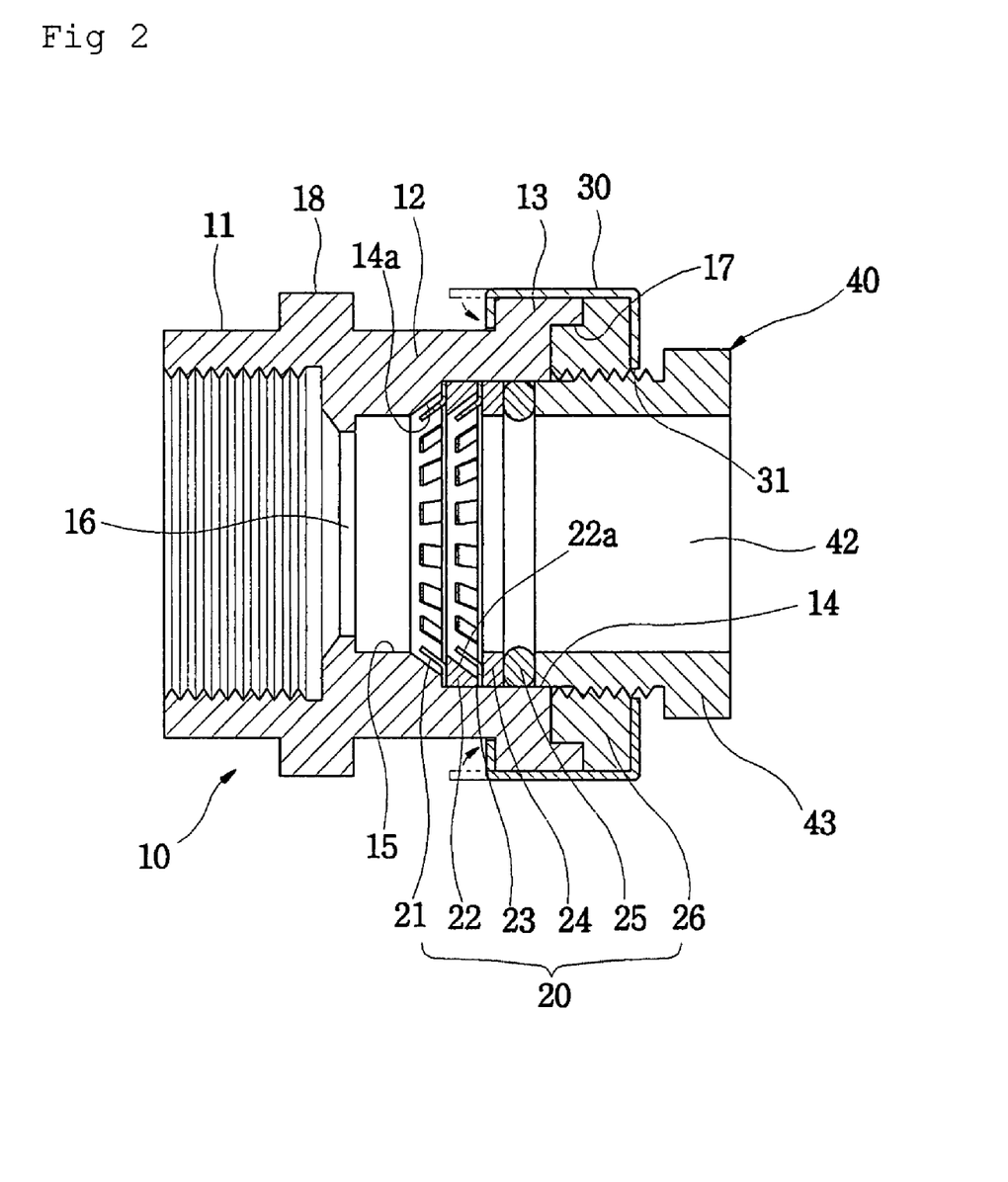
FIG. 2 is a cross sectional view illustrating the coupling device shown in FIG. 1, in an assembled state.

FIG. 1 is an exploded perspective view illustrating a coupling device according to an embodiment of the present invention, and FIG. 2 is a cross sectional view illustrating the coupling device shown in FIG. 1 in an assembled state. Referring to FIGS. 1 and 2, the coupling device of the present invention includes a body 10, a circular pipe locking means 20, a fixing member 30 and an adjustment member 40. The body 10 includes a first coupling section 11 at one portion thereof, a second coupling section 12 at another portion thereof, a flange 13 protruding from an end of the second coupling section 12, a coupling hole 14 formed in the second coupling section 12, a circular pipe coupling hole 15 extending from the coupling hole 14 and a connecting hole 16 extending from the circular pipe coupling hole 15 through the first coupling section 11. The circular pipe locking means 20 includes a first locking ring 21, a first support ring 22, a second locking ring 23, a ring 24, a first ring packing 25 and a nut 26, which are inserted sequentially into the coupling hole 14 of the body 10. The fixing member 30 has a hole 31 formed in one portion thereof, corresponding to a screw hole 26a of the nut 26. When the nut 26 and the flange 13 of the body 10 are inserted in to the fixing member 30, it is bent at the other portion thereof to press against the flange 13, thereby fixing the nut 26 to the flange 13. The adjustment member 40 has an entrance hole 42 corresponding to the outside diameter of a circular pipe 50, which will be inserted into the adjustment member 40. The adjustment member 40 has threads 41 formed on the outer circumference of the adjustment member 40, for engaging into the screw hole 26a of the nut 26, thereby applying external force to the first ring packing 25.

A bolt head 18 is formed between the first and second coupling sections 11 and 12 of the body 10. For coupling with a connecting region of a counterpart connector or connecting device, the first coupling section 11 has a screw hole formed in the inner periphery thereof, or may have threads formed in the outer periphery thereof.

A slope 14a is formed in an inner end of the coupling hole 14 connecting to the circular pipe coupling hole 15. The diameter of the circular pipe coupling hole 15 is the same as the outside diameter of the circular pipe 50, and the diameter of the coupling hole 16 is the same as the inside diameter of the circular pipe 50.

The first and second locking rings 21 and 23, which are components of the circular pipe locking means 20, are made of metal. Each of the first and second locking rings 21, 23 has a plurality of clamping fingers 21b, 23b protruding from a flat, annular rim 21a, 23a. The clamping fingers 21b, 23b are inclined in a direction of inserting the circular pipe 50 in order to clamp and fix the circular pipe 50. A passage is defined by the clamping fingers 21b, 23b, and the diameter of the passage is slightly smaller than the outside diameter of the circular pipe 50.

The first support ring 22 has a slope 22a in an inner periphery thereof. The slope 14a of the body 10 and the slope 22a of the first support ring 22 serve to restrict the range within which the locking sections 21a and 23b can be pushed by the external force, which is applied to the circular pipe 50. Accordingly, the locking sections 21a and 23b are not damaged, but can realize a sufficient amount of locking force.

The ring 24 is made of hard synthetic resin, and the first ring packing 25 is made of rubber. The inside diameter of the first ring packing 25 is sized such that the circular pipe 50 is tightly inserted.

A projection 26b is formed in the front portion of the nut 26 and an insert hole 17 for receiving the projection 26b, is formed at the entrance of the coupling hole 14 so that a process of fixing the nut 26 to the flange 13 using the fixing member 30 can be carried out more easily. When the projection 26b and the insert hole 17 are rectangularly shaped, the bent end portion of the fixing member 30 can fix the nut member 26 so that it does not rotate even though the end portion of the fixing member 30 is not pressed against the flange 13.

As another approach to fix the flange 13 without having to rotate the nut 26, fitting sections that match each other may be formed in the inner periphery of the fixing member 30 and the outer periphery of the nut 26. As a further approach, fitting sections may be formed in regions where the flange 13 and the nut 26 butt against each other. Of course, these approaches fall within the scope of the present invention.

The diameter of the entrance hole 42 of the adjustment member 40 is sized such that the circular pipe 50 can be properly inserted into the entrance hole 42. The outer portion of the threads 41, which remains outside the hole 31, leads to a bolt head 43.

After the first locking ring 21, the first support ring 22, the second locking ring 23, the ring 24 and the first ring packing 25, which are components of the circular pipe locking means 20, are inserted sequentially into the coupling hole 14, the nut 26 is fixed to the flange 13 using the fixing member 30, as explained above, and the threads 41 are screwed into the screw hole 26a so that the adjustment member 40 contacts the first ring packing 25.

Figure 3:
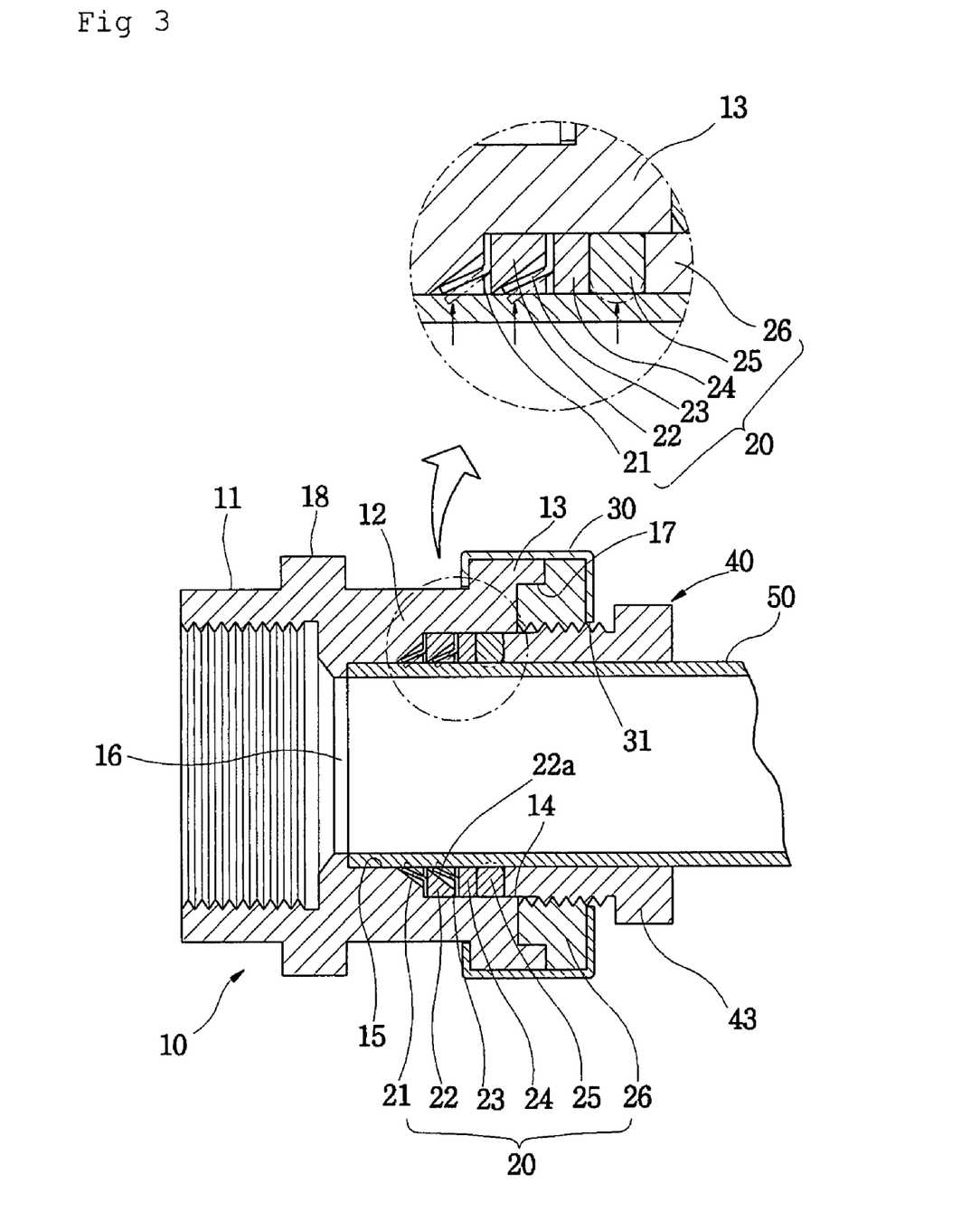
FIG. 3 is a cross sectional view illustrating the usage of the coupling device shown in FIG. 1.

As the circular pipe 50, which has a uniform outside diameter, is pushed through the entrance hole 42 of the adjustment member 40 into the circular pipe coupling hole 17, the clamping fingers 21b and 23b, inclined in the direction of inserting the circular pipe 50, are spread and clamp the outer periphery of the circular pipe 50, as shown in FIG. 3. Once the circular pipe 50 is coupled as above, even though if force is applied to the circular pipe 50 in a direction opposite the direction of inserting the circular pipe 50, the inclined clamping fingers 21b and 23b block the circular pipe 50 so that the circular pipe 50 does not escape from the second coupling section 12.

Since two sets of the aforementioned clamping fingers 21b and 23b clamp the circular pipe 50 in close proximity, even if the circular pipe 50, inserted through the second locking ring 23, becomes slightly deviated from a horizontal position, the locking fingers 21b of the first locking ring 21 act to set the circular pipe 50 in a horizontal position while allowing the coupling state of the circular pipe 50 to be more stably maintained.

When the circular pipe 50 is engaged into the circular pipe coupling hole 15 through the entrance hole 42 of the adjustment member 40, as described above, another pipe or device is connected to the first coupling section 11. In the case where leakage takes place, the adjustment member 40 can be further tightened so that the first ring packing 25 is pressed further than the original position, and is thus deformed. Then, the first ring packing 25 is closely pressed between the coupling hole 14 and the circular pipe 50, thereby maintaining an excellent seal. This means that the present invention can prevent leakage simply by tightening the adjustment member 40, unlike the prior art, which requires that the body 10 be damaged or that the circular pipe 50 be cut.

Figure 4:
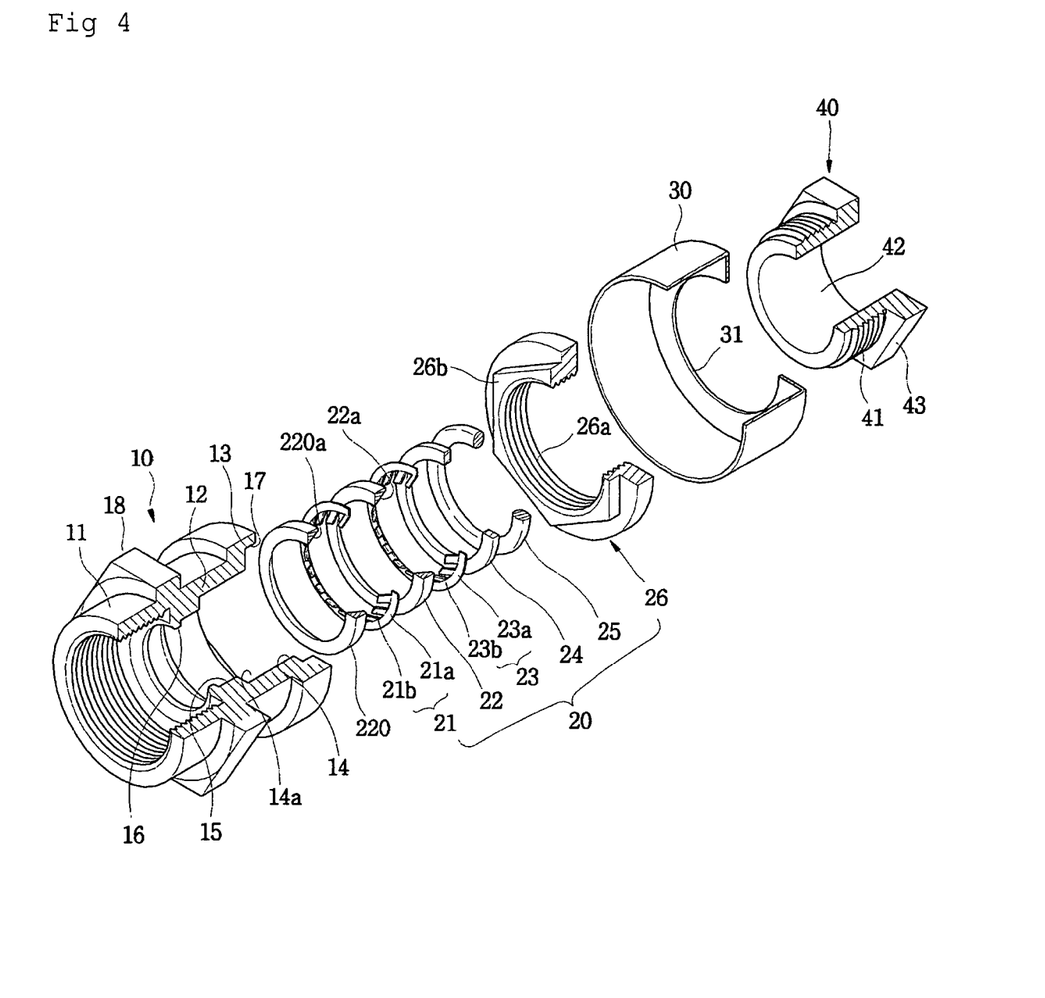
FIG. 4 is a cross sectional view illustrating a locking means of the coupling device shown in FIG. 1.

FIG. 4 illustrates an alternative to the circular pipe locking means 20. Referring to FIG. 4, in place of the slope 14*a*, which is formed in the coupling hole 14 of the body 10, a second support ring 220 having a slope 220*a* in the inner periphery, like the first support ring 22, is inserted into the coupling hole 14.

The slope 220*a* of the second support ring 220 has the same role as the slope 14*a* of the coupling hole 14.

Figure 5:
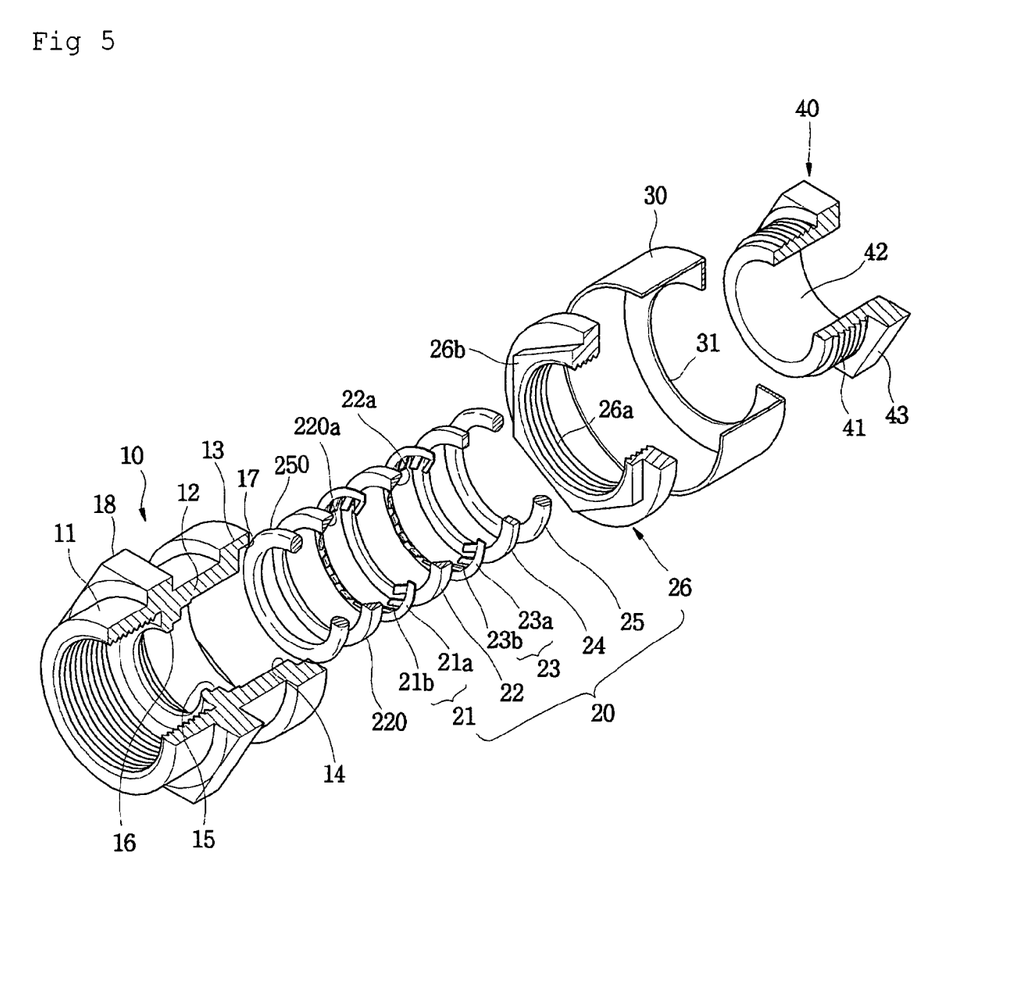
FIG. 5 is an exploded perspective view illustrating a coupling device according to another embodiment of the present invention.
Figure 6:
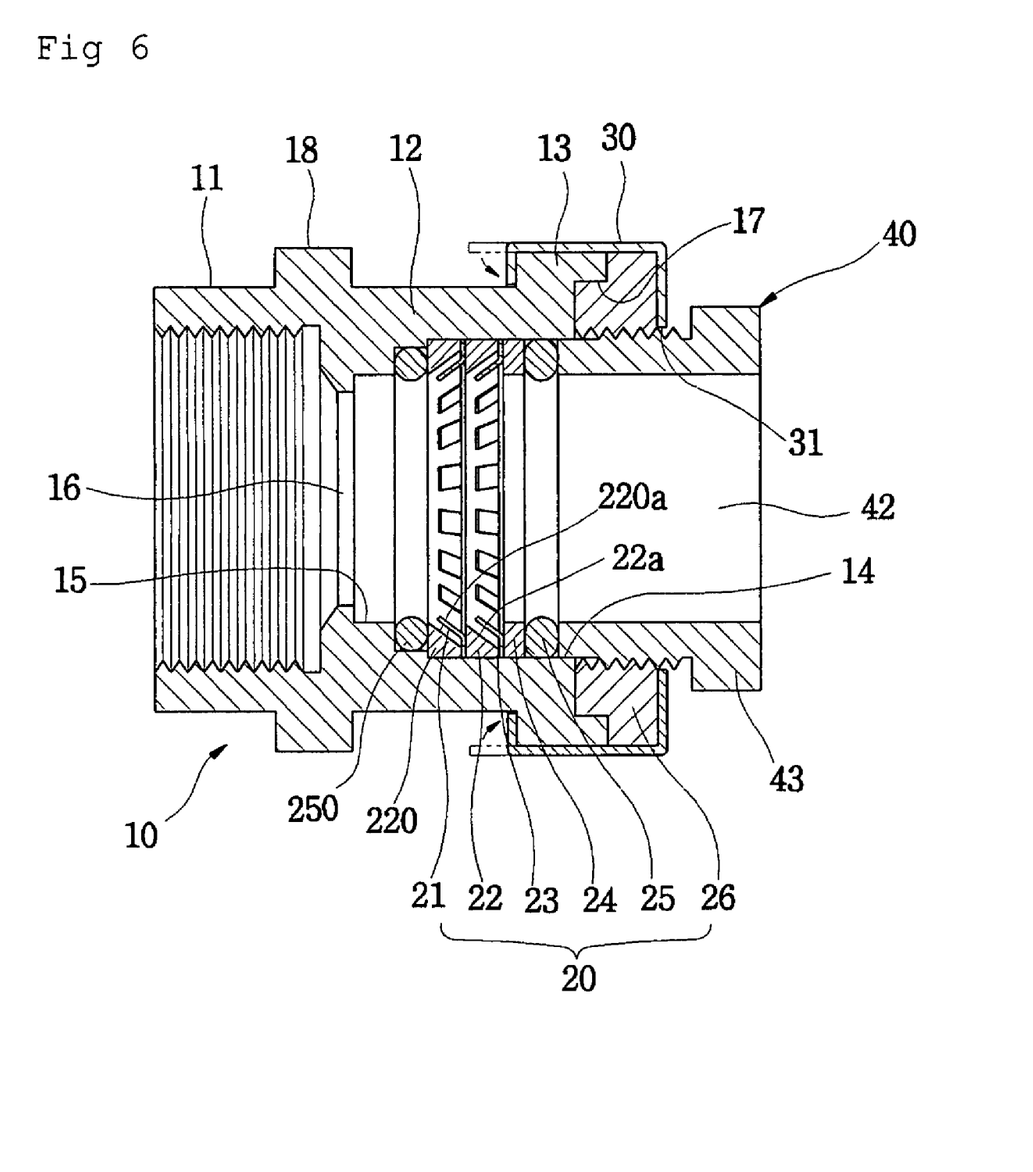
FIG. 6 is a cross sectional view illustrating the coupling device shown in FIG. 5 in an assembled state.
Figure 7:
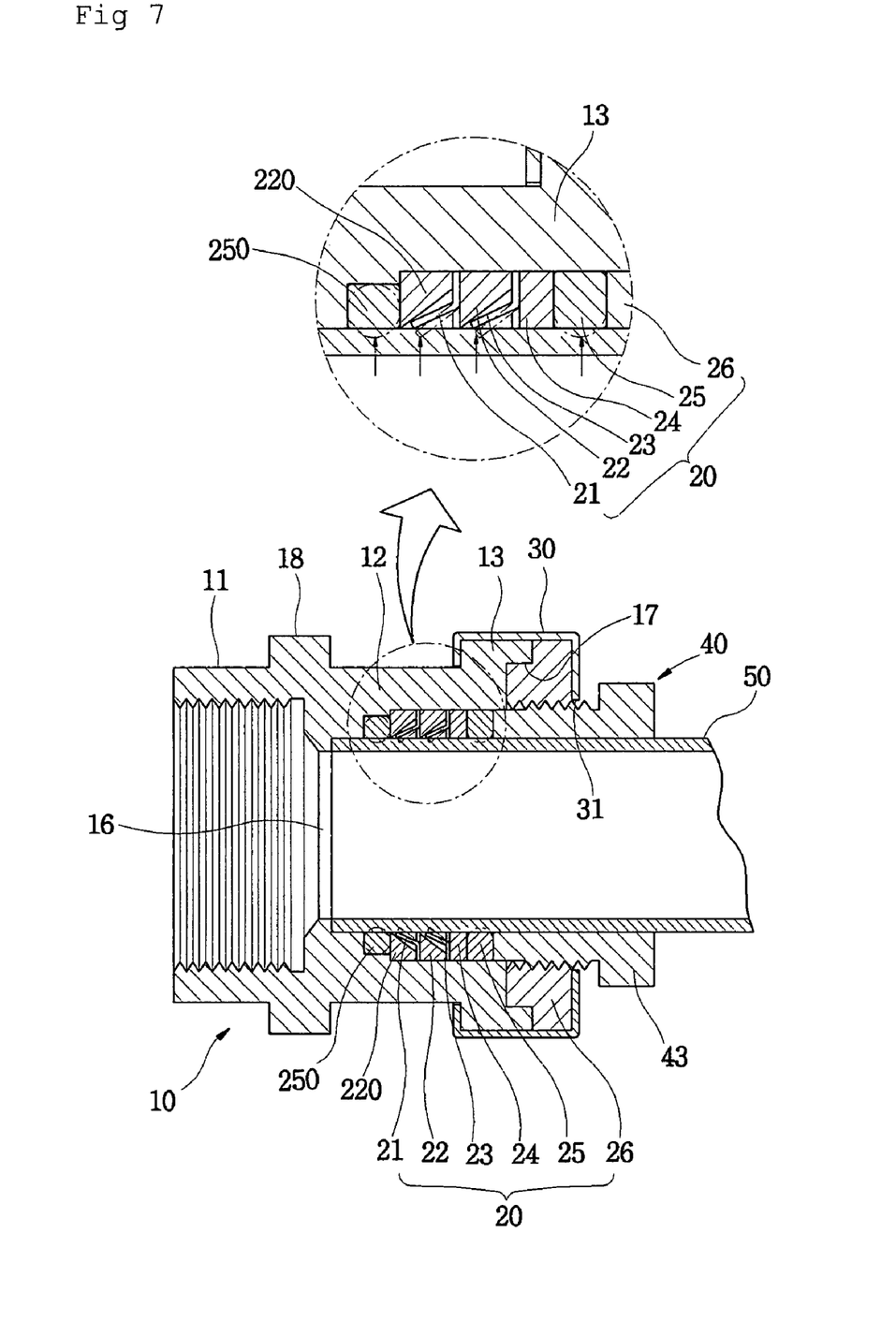
FIG. 7 is a cross sectional view illustrating the usage of the coupling device shown in FIG. 5.

FIGS. 5 to 7 illustrate another embodiment, which further includes a second ring packing 250 in addition to the construction of the embodiment shown in FIG. 4. The second ring packing 250 is pressed by the adjustment member 40 so that a seal can be maintained more satisfactorily.

In this embodiment of the present invention, the second ring packing 250 is arranged in the coupling hole 14 together with the second support ring 220, so that the seal of the coupling hole 14 can be ensured by both of the first and second ring packings 25 and 250. In addition, when the adjustment member 40 is tightened, an external force is applied to both the first ring packing 25 and the second ring packing 250 so that the first and second ring packings 25 and 250 can be closely fitted into the coupling hole 14, thereby ensuring a more reliable seal.

Figure 8:
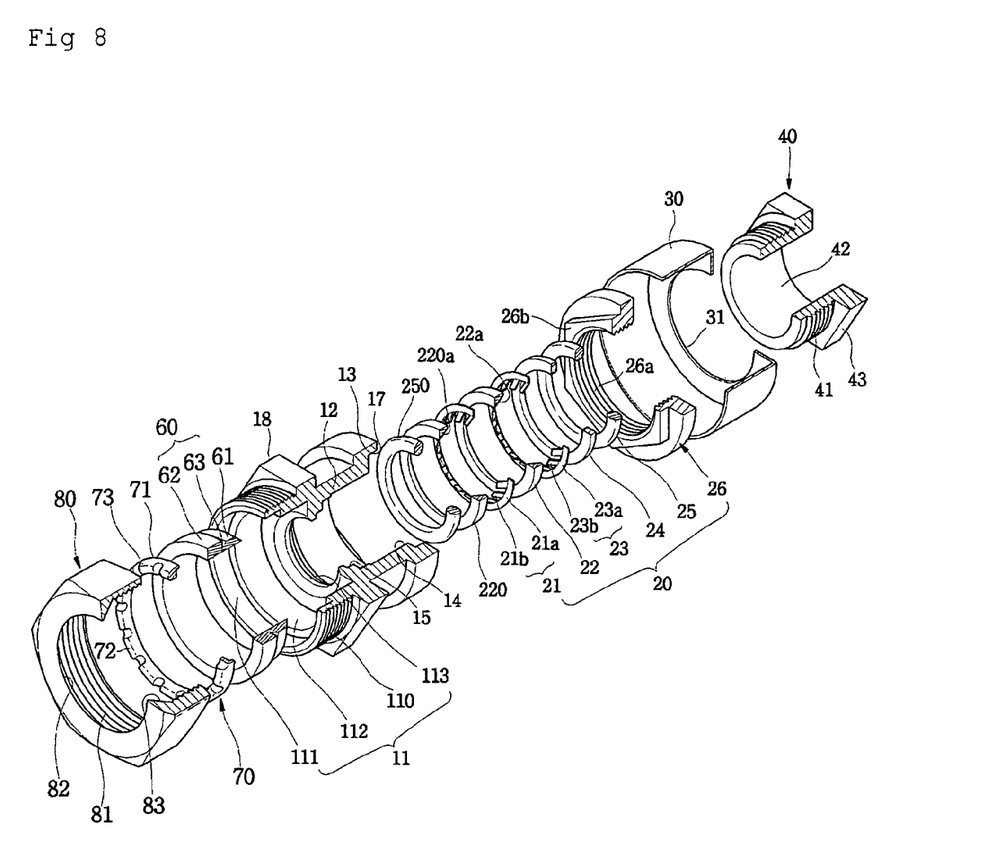
FIG. 8 is an exploded perspective view illustrating a coupling device according to a further embodiment of the present invention.
Figure 9:
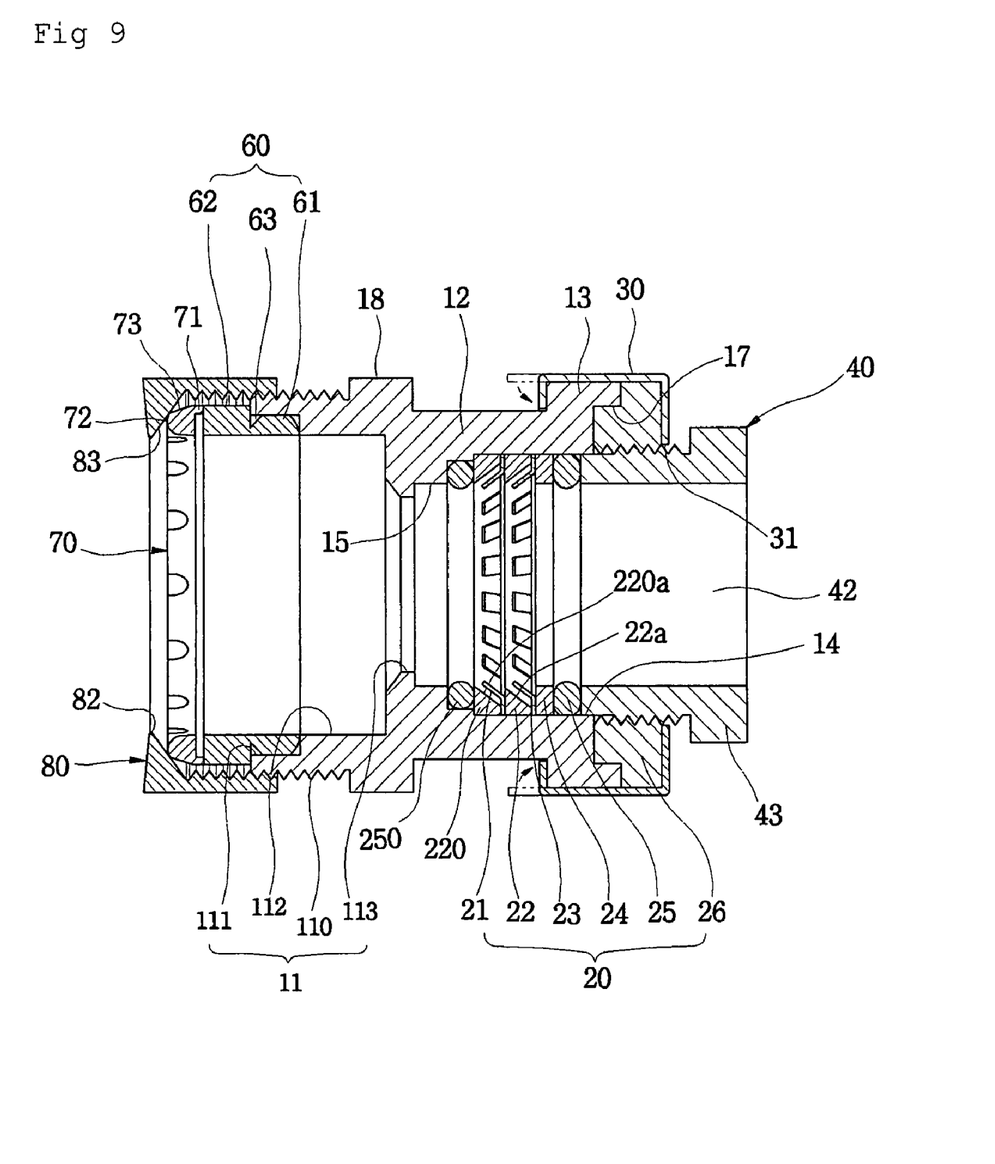
FIG. 9 is a cross sectional view illustrating the coupling device shown in FIG. 8 in an assembled state.

FIGS. 8 to 9 illustrate a coupling device, which further includes a corrugated pipe connecting means. The corrugated pipe connecting means is arranged in a portion opposite the second coupling section 12, where the circular pipe locking means 20 is provided, in order to connect the circular pipe 50 with a corrugated pipe 90.

Figure 10:
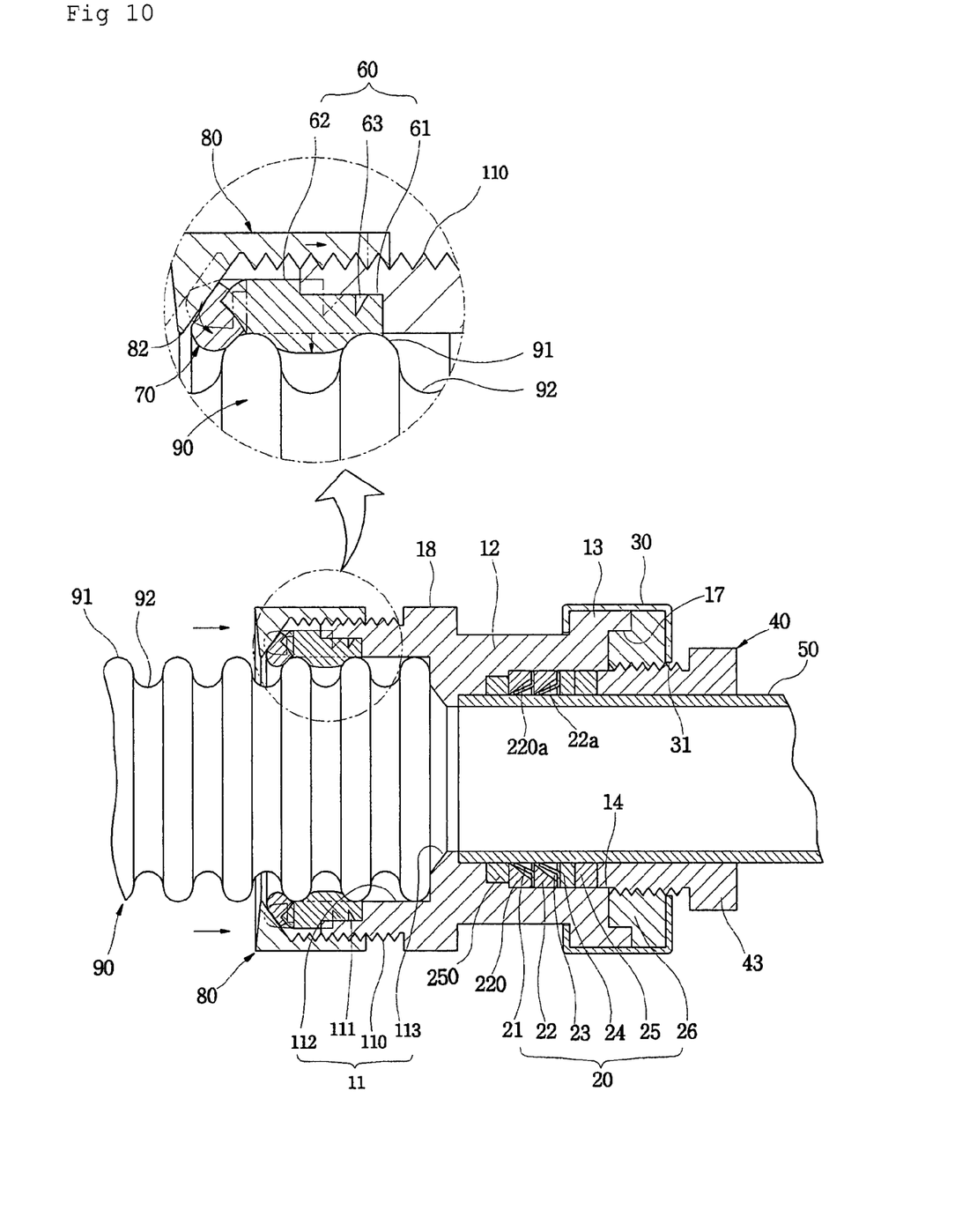
FIG. 10 is a cross sectional view illustrating the usage of the coupling device shown in FIG. 8.

Referring to FIG. 10, the corrugated pipe 90 is connected to the first coupling section 11 and the circular pipe 50 is connected to the second coupling section 12 using the coupling device of the present invention as explained above.

Accordingly, a corrugated pipe connecting means is further provided to the construction of the coupling device for circular pipes, as explained above. In greater detail, the corrugated pipe connecting means includes a first coupling section 11, which is a modification of the first coupling section 11 of the coupling device for circular pipes, as explained above. The first coupling section 11 of this embodiment has threads 110 in the outer periphery thereof, a packing coupling hole 111 at an entrance thereof, a corrugated pipe coupling hole 112 extending from the packing coupling hole 111 and an annular prominence 113 between the corrugated pipe coupling hole 112 and the circular pipe coupling hole 15. The corrugated pipe connecting means also includes a packing 60, a compression ring 70 and a locking member 80. The packing 60 has an insert section 61 at one portion, inserted into the packing coupling hole 111, and a protrusion 62 at the other portion, extending out of the packing coupling hole 111. The compression ring 70 has a ring section 71 in contact with the end of the protrusion 62 of the packing 60 and a plurality of jaws 72 projecting opposite to a direction of inserting the corrugated pipe 90. A slope 73 is formed at an outer portion of a respective jaw 72. The locking member 80 has a screw hole 81 in the inner periphery, engaging with the threads 110, an entrance hole 82 in the center of one portion and a slope 83 between the screw hole 81 and the entrance hole 82, corresponding to the slopes 73 of the jaws 72.

Of course, a coupling device that includes only the corrugated pipe connecting means can be fabricated and used as a product.

A groove 63 is formed between the insert section 61 and the protrusion 62 of the packing 60.

The diameter of the corrugated pipe coupling hole 112 is sized such that the outside diameter of peaks 91 of the corrugated pipe 90 can be inserted freely into the corrugated pipe coupling hole 112. The inside diameter of the packing 60, which is made of a soft synthetic resin, is sized such that the corrugated pipe 90 can be inserted tightly into the packing 60.

The compression ring 70 is made of a hard synthetic resin, and the inside diameter of the compression ring 70, defined by the jaws 72, is sized such that the corrugated pipe 90 can be inserted smoothly into the compression ring 70.

In a state where the locking member 80 is not tightened, the corrugated pipe 90 is inserted freely through the entrance hole 82 of the locking member 80 and the compression ring 70 until it is blocked by the annular prominence 113, which protrudes through the coupling hole 112.

As the locking member 80 is tightened from this position, the slopes 73 are pressed down by the slope 83 so that the jaws 72 are contracted to clamp grooves 92 of the corrugate pipe 90, thereby securely fixing the corrugated pipe 90 to the first coupling section 11. The protrusion 62 is pressed by the ring section 71 to enhance the tightness of the packing 60, thereby maintaining a more reliable seal.

When the locking member 80 is released from its locked position, the protrusions 72 are spread by elastic force, and thus the corrugated pipe 90 can be separated from the first coupling section 11 when pulled outward.

In the second coupling section 12 for engaging with the circular pipe 50 as shown in FIG. 10, the construction and the coupling process thereof are the same as described above.

According to the present invention as set forth above, the locking rings, which are inserted into the body to clamp a circular pipe, are arranged in a pair so that the central line of the circular pipe can be aligned when the circular pipe is inserted. Furthermore, the extent to which the body presses the seal packing can be adjusted. Accordingly, a reliable seal can be maintained and the circular pipe can be securely coupled no matter who uses the coupling device of the present invention.

Furthermore, the present invention can be also adapted to the case where it is more effective to replace one of the circular pipes with a corrugated pipe. The first coupling section and the connecting means, which can engage with the corrugated pipe, are provided opposite the second coupling section, which is coupled with the circular pipe. Accordingly, the present invention can advantageously connect the corrugated pipe with the circular pipe.

While the present invention has been described with reference to the particular illustrative embodiments and the accompanying drawings, it is not to be limited thereto, but will be defined by the appended claims. It is to be appreciated that those skilled in the art can substitute, change or modify the embodiments into various forms without departing from the scope and spirit of the present invention.

What is claimed is:

1. A coupling device for circular pipes, comprising:
   a body including a first coupling section at one portion thereof, a second coupling section at another portion thereof, a flange protruding from an end of the second coupling section, a coupling hole formed in the second coupling section, a circular pipe coupling hole extending from the coupling hole and a connecting hole extending from the circular pipe coupling hole and through the first coupling section;
   a circular pipe locking means including a first locking ring, a first support ring, a second locking ring, a ring, a first ring packing and a nut, which are inserted sequentially into the coupling hole of the body;

a fixing member for fixing the nut to the flange of the body; and an adjustment member having an entrance hole corresponding to an outside diameter of a circular pipe, which will be inserted into the adjustment member, and threads formed on an outer circumference of the adjustment member, the threads engaging into a screw hole of the nut, thereby applying an external force to the first ring packing, the fixing member having a hole formed in one portion thereof, corresponding to a screw hole of the nut, and being configured to bend at another portion thereof to press against the flange when the nut and the flange of the body are inserted into the fixing member, thereby fixing the nut to the flange.

2. The coupling device according to claim 1, wherein the nut has a rectangular protrusion and the body has a rectangular insert hole at an entrance of the coupling hole.

3. The coupling device according to claim 1, further comprising a second support ring, inserted into the coupling hole, to be placed in front of the first locking ring, the second support ring having a slope in an inner periphery thereof.

4. The coupling device according to claim 3, further comprising a second ring packing inserted into the coupling hole to be placed in front of the second support ring.

5. The coupling device according to claim 1, wherein the body further includes a bolt head between the first and second coupling sections.

6. The coupling device according to claim 1, wherein the nut has a protrusion on one side thereof, and wherein the body further includes an insert hole for receiving the protrusion of the nut, arranged at an entrance of the coupling hole.

7. A coupling device for circular pipes, comprising:
a body including a first coupling section at one portion thereof, a second coupling section at another portion thereof, a flange protruding from an end of the second coupling section, a coupling hole formed in the second coupling section, a circular pipe coupling hole extending from the coupling hole and a connecting hole extending from the circular pipe coupling hole and through the first coupling section;

a circular pipe locking means including a first locking ring, a first support ring, a second locking ring, a ring, a first ring packing and a nut, which are inserted sequentially into the coupling hole of the body;

a fixing member for fixing the nut to the flange of the body; and an adjustment member having an entrance hole corresponding to an outside diameter of a circular pipe, which will be inserted into the adjustment member, and threads formed on an outer circumference of the adjustment member, the threads engaging into a screw hole of the nut, thereby applying an external force to the first ring packing, the first support ring having a slope in an inner periphery thereof, and the coupling hole having a slope at an inner end thereof, the slopes of the first support ring and the coupling hole restricting a position of clamping fingers.

8. The coupling device according to claim 7, further comprising a second support ring, inserted into the coupling hole, to be placed in front of the first locking ring, the second support ring having a slope in an inner periphery thereof.

9. The coupling device according to claim 8, further comprising a second ring packing inserted into the coupling hole to be placed in front of the second support ring.

10. The coupling device according to claim 7, wherein the body further includes a bolt head between the first and second coupling sections.

11. The coupling device according to claim 7, wherein the nut has a protrusion on one side thereof, and wherein the body further includes an insert hole for receiving the protrusion of the nut, arranged at an entrance of the coupling hole.

* * * * *